March 27, 1951
D. D. AREHART
2,546,206
TRAILER HITCH
Filed Feb. 23, 1946
2 Sheets-Sheet 1
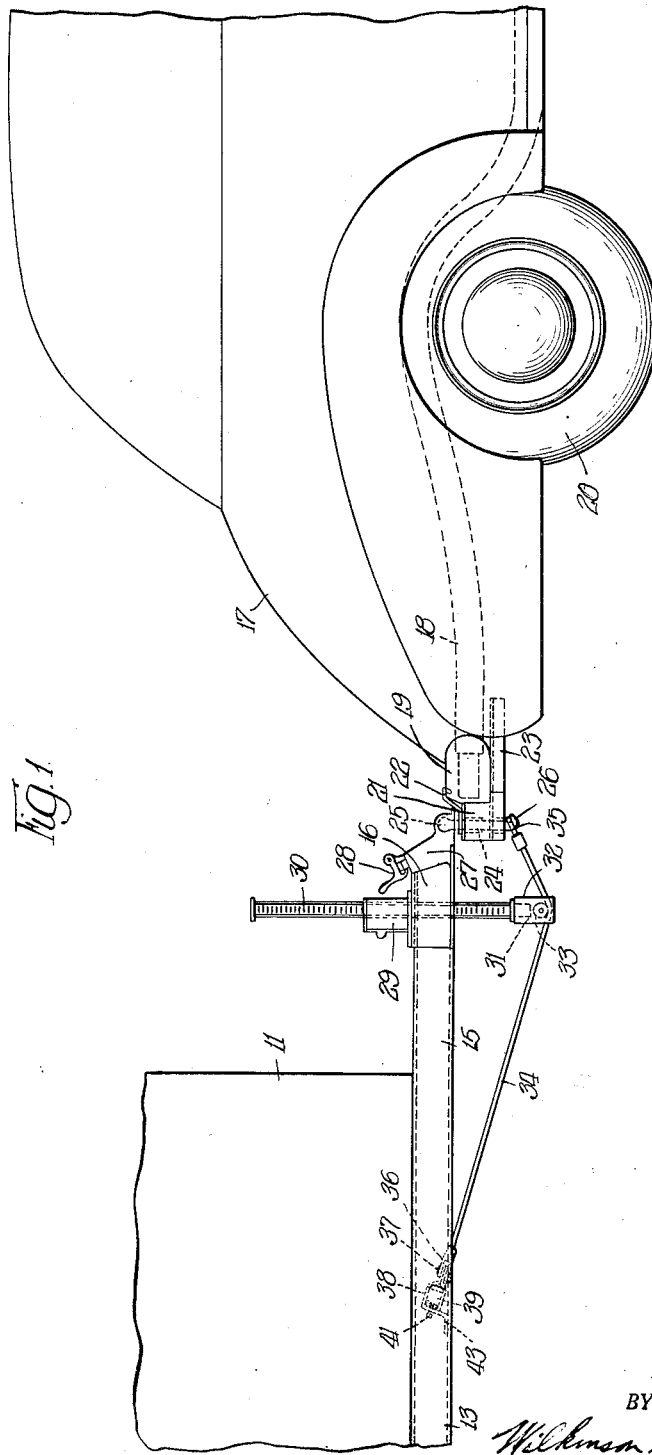
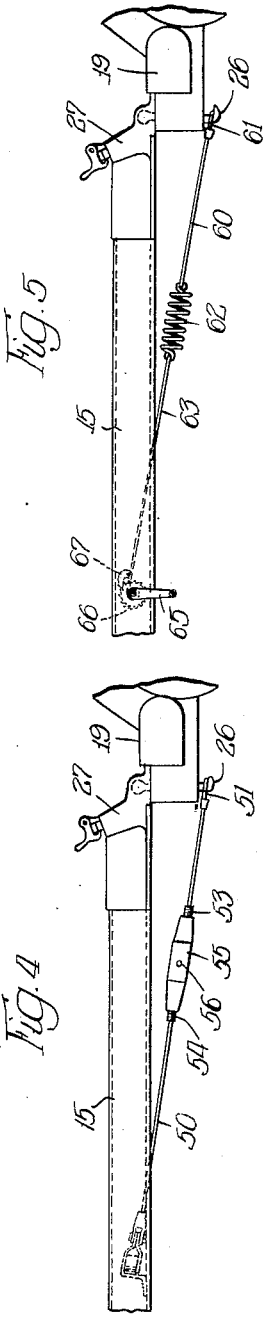
INVENTOR.
David D. Arehart,
BY
Wilkinson Huxley, Byron & Knight
ATTYS.

March 27, 1951 D. D. AREHART 2,546,206
TRAILER HITCH
Filed Feb. 23, 1946 2 Sheets-Sheet 2
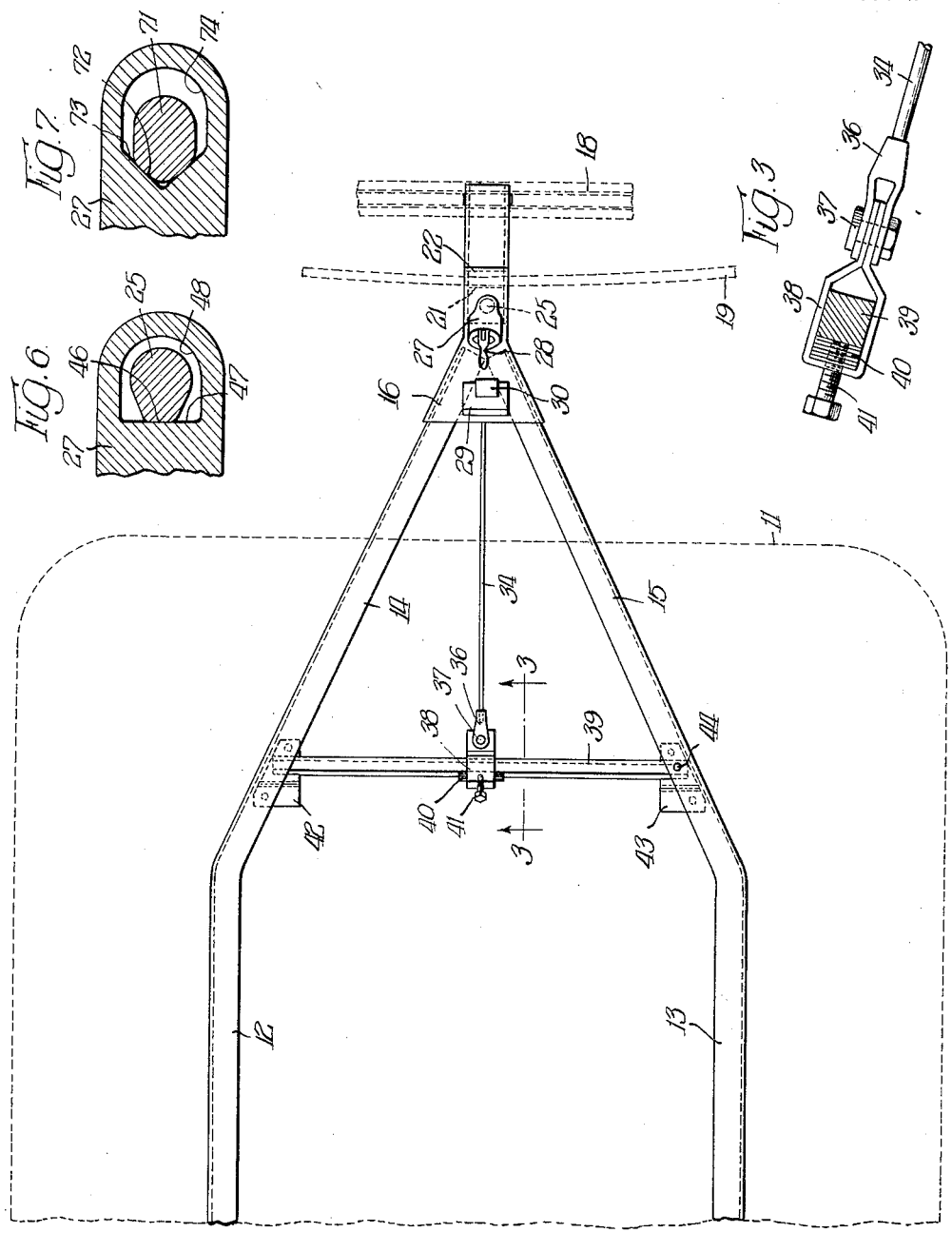

Patented Mar. 27, 1951

2,546,206

UNITED STATES PATENT OFFICE 2,546,206

TRAILER HITCH

David D. Arehart, Flint, Mich., assignor to Palace Corporation, Flint, Mich., a corporation of Michigan Application February 23, 1946, Serial No. 649,534

7 Claims. (Cl. 280—33.4)

This invention relates to a new and improved trailer hitch, and more particularly to a hitch which selectively distributes the trailer load on the front and rear wheels of a towing vehicle and on the trailer wheels.

While the present hitch is of wide application and may be used to connect trailers of various types to commercial types of tractors, it is particularly useful in connecting two wheeled trailers to usual types of passenger cars. The term two wheeled trailers is intended to include trailers having dual or tandem wheels, but in which the load is unbalanced so that a portion of the load is normally carried by the towing vehicle. The hitch may be used with smaller cargo trailers or the like, but is of greatest utility in connection with house trailers or other relatively heavy trailers which impose a substantial vertical load on the rear wheels and springs of the towing vehicle when connected by means of usual types of trailer hitches.

The usual types of trailer hitches provide various means for pivotedly connecting the forward end or extension of a trailer frame to a fitting secured to the rear bumper and rear portion of the chassis frame of the towing vehicle. The trailer is normally provided with wheels well to the rear of its center of mass so as to render the trailer safe against tipping rearwardly under all conditions of use. In a typical construction, the trailer wheels are located with approximately two thirds of the trailer located forwardly of the trailer wheels. Thus when this unbalanced load is applied to the rear of a motor car, it depresses the rear springs and lowers the rear of the car. This action has a tendency to unbalance the weight of the car itself and cause more of that weight to be transmitted to the rear axle. The trailer load is applied to the cantilever overhang in the rear of the rear axle and has a tendency to lift the front axle. This may cause loss of traction with the front wheels sufficient to render steering with these wheels inefficient, especially under slippery road conditions.

Attempts are made to correct these unbalanced conditions by adding extra, stiff leaves in the rear springs of the towing vehicle. Such attempts are expensive and render the vehicle less satisfactory in use when not towing the trailer. They are also only slightly effective in correcting the real difficulties, as the load remains unbalanced with the rear axle and tires heavily overloaded.

It is an object of the present invention to provide a new and improved trailer hitch having adjustable means whereby the trailer load may be distributed as desired between the front and rear axles of towing vehicle and the trailer wheels.

It is also an object to provide a hitch by means of which the forward end of the trailer and rear end of the towing vehicle may be jointly adjusted as to height above the ground.

It is an additional object to provide a construction in which means are provided for minimizing side sway or swinging of the trailer.

It is a further object to provide a hitch which is simple in design and construction and designed for commercial production and use.

Other and further objects will appear as the description proceeds.

I have shown certain preferred embodiments of my invention in the accompanying drawings, in which—

Figure 1 is an elevation of one form of construction of the present hitch with portions of the trailer and towing vehicle;

Figure 2 is a plan view of the construction of Figure 1;

Figure 3 is a fragmentary section taken on line 3—3 of Figure 2;

Figure 4 is an elevation showing a modified form of construction;

Figure 5 is a view similar to Figure 4, showing a further modified form of construction;

Figure 6 is a horizontal section on an enlarged scale through one form of towing connection; and Figure 7 is a similar section showing a modified form of construction.

Referring first to the form of construction shown in Figures 1 to 3 inclusive, the forward portion of a trailer has been indicated at 11, the trailer having a substantially rigid underframe comprising two members, 12 and 13, the forward portions of which are inwardly inclined, as shown at 14 and 15, and joined by the member 16. A motor vehicle has been indicated at 17, being provided with a chassis frame 18 and rear bumper 19 connected to the frame. The rear wheels of the vehicle are shown at 20.

The tractor assembly 21 is rigidly secured to the rear bumper 19 by the hook 22, and to the chassis frame by the forwardly extending member 23. This assembly 21 includes the vertically extending pin 24, having the ball head 25 and the downwardly extending hook portion 26. The trailer frame member 16 is provided with a socket member 27 for engaging the ball 25 of the tractor assembly carried by the vehicle. A suitable mechanism is provided, as indicated at 28, for latching the trailer socket member 27 to the ball 25. This mechanism has not been shown in detail, as numerous devices of this character are available, and its specific details form no part of the present invention.

The member 16 carries the fixed jack mechanism 29, through which extends the reciprocating jack member 30. The particular mechanism for moving the member 30 upwardly and downwardly has not been shown in detail, since any known type of jack may be used. The lower end of member 30 is shown as provided with an extending lug 31 which fits into a socket in the member 32. This member 32 may be removed from the jack if desired, when the jack is used as a support for the forward portion of the trailer and not as an element of the hitch. Member 32 is shown as provided with a roller 33 which engages the tension member 34. The free end of the tension member 34 is shown as provided with an eye 35, adapted to be fitted onto the hook 26. The rear end of member 34 is shown as provided with a clevis 36 connected by a pin 37 to the stirrup 38, which extends around the cross bar 39. A plurality of shims 40 are shown between the stirrup 38 and the rear face of bar 39, these being used to adjust the effective lengths of the cable 34. The cap screw 41 passes through openings through the shims 40, and is threaded into the stirrup 38. This screw 41 is provided merely to hold the shims in place and not to transmit the load from the stirrup 38 to the bar 39. As best shown in Figure 2, the ends of the bar 39 are seated in brackets 42 and 43 secured to the trailer frame portions 14 and 15, respectively. The end of bar 39 in bracket 43 is secured against longitudinal movement by the pin 44 passing through the frame member. The opposite end of the bar 39 is free to slide longitudinally in the bracket 42.

The form of construction shown in Figure 4 is similar to that just described insofar as the trailer frame and the draft mechanism on the motor vehicle are concerned. In this construction, no jack is provided. The cable 50 has an eye 51 to fit around the hook 26 of the tractor assembly on the towing vehicle. The rear end of cable 50 is connected to the cross bar 39 of the trailer in the same manner as shown in Figure 2. The cable is formed in two sections provided with threaded members 53 and 54 which are oppositely threaded into the sleeve 55 forming a turnbuckle so that rotation of the sleeve 55 in one direction draws both sections of the cable tight, while rotation in the opposite direction loosens the cable. The sleeve 55 is provided with an opening 56, through which a pin may be passed for rotating the leeve and tightening the cable.

The form of construction shown in Figure 5 is also similar insofar as the trailer and tractor mechanism are concerned. In this construction also, the jack is eliminated. A cable section 60 has an eye 61 fitted about the hook 26 on the draft assembly 19. This cable section 60 is connected by a stiff tension spring 62 to a cable section 63. The opposite end of the cable section 63 passes about a shaft 64, which is rotatably mounted in the forwardly extending portions 14 and 15 of the trailer frame. This shaft is provided with a ratchet 66 and pivoted latch 67, so that the cable is held under the tension to which it is adjusted.

While the term "cable" has been used in connection with tension members of the various forms of construction, it will be understood that other flexible means, such as chains, may be substituted; and in Figure 4, for instance, rods may be used. The cross bar 39, which is used in the forms of construction shown in Figures 1 to 4 inclusive, is formed of steel having resilience adequate to take care of the stresses encountered. It will be flexed or bowed forwardly in the center, depending upon the load applied to that point, and it is provided with one free end so that it may take this position without pulling inwardly upon the frame members in which it is supported.

The constructions of the towing connections shown in Figures 6 and 7 are provided for the purpose of minimizing side swaying or swinging of the trailer. As shown in Figure 6, the ball 25 has a flattened rear face 46. This flattened face 46 engages the flattened rear face 47 of the ball receiving socket 48 of member 27. In Figure 7 the ball 71 has a somewhat pointed rear face 72 which engages similar faces 73 in the ball socket 74. These various faces are shown in cross section, and it will be understood that they may be rounded in a vertical plane to maintain substantial contact area through a range of relative tilting of trailer and vehicle. The tension members act to hold the rear of the ball against the socket rather than against the front of the socket, as in usual hitches. The resilience of the tension member, or the cross bar to which it is attached, permits sufficient yielding for turning corners with the hitch, while at the same time, serving to reduce unwanted side sway or swinging of the trailer.

In the forms of construction shown, the upper members comprising the trailer frame are rigid and in compression, and the lower members, such as the cables or equivalent means, are in tension. The ball 25 is held against movement in its socket in the member 27, insofar as movement in a horizontal plane is concerned, but can rotate to the necessary extent in that socket. It will be apparent that tension on the lower member will have the tendency to draw the hook 26 rearwardly, and consequently to rotate the pin 24 about the ball head 25 in a clockwise direction, as seen in Figure 1. In actual operation, there is substantial rotation in this direction.

In the use of the form of construction shown in Figures 1 to 3 inclusive, the jack is lowered to support the forward end of the trailer at a suitable height above the ground so that the socket in member 27 will clear the top of the ball 25 with the vehicle 17 in normal position. The member 34 is not in use at this time. The vehicle and trailer are maneuvered to bring the socket above the ball 25, and the jack is lowered so that the socket seats on the ball and the weight of the forward portion of the trailer is taken up by the vehicle. This will cause the rear of the vehicle to sag substantially. The jack 30 is then raised and cable 34 has its eye 35 placed on hook 26. The jack is then forced downwardly until the roller 33 bears on cable 34. At this time, the trailer and vehicle will still be in the lower position with the weight of the trailer applied to the rear springs and wheels of the vehicle. The jack 30 is then forced downwardly against the cable 34, which has the effect of pulling rearwardly on the hook 26 and rotating the pin 24 in a clockwise direction. This movement serves to lift the forward end of the trailer and the rear end of the car, although no parts of the hitch are touching the ground. The jack may be adjusted to raise the front of the trailer and rear of the vehicle the desired amount for proper distribution of the trailer load on the front and rear axles of the vehicle and on the trailer wheels.

The action which takes place is due to the fact that the lever formed by the distance between the ball 25 and hook 26 is substantially at right angles to the chassis frame of the car and is rigidly connected thereto. Thus when the vertical lever turns in a clockwise direction, the chassis frame turns in the same direction. It actually moves about the rear axle as a pivot so that the rear of the car comes up and the front goes down because of the spring suspension of the vehicle wheels. If the wheels were rigidly connected to the frame, the rear wheels could be lifted clear of the ground by actuating the jack to apply tension to the members, and if sufficient range of adjustment were provided, that result could be had with spring suspended wheels.

Such action is not desired in practice, but it is the purpose of the construction to distribute the load properly between the front and rear axles of the vehicle while maintaining an adequate portion of the load on the rear wheels for effective traction.

The forms of construction in Figures 4 and 5 operate in the same manner. In Figure 4, tension is applied to the tension member by rotating the turnbuckle sleeve 55. In the construction of Figure 5, the tension is applied by rotating crank 65. It will be understood that the showing is somewhat diagrammatic and that any standard form of force multiplying mechanism may be inserted between the handle and the cable receiving portion of the shaft.

It is preferable that the connecting hook for the tension member be located substantially vertically below the ball connection, so that lateral swinging of the trailer relative to the vehicle does not either tighten or loosen the tension. While the vertical distance between the ball joint and tension member connection may be any reasonable distance, it has been found in practice that nine or ten inches provides adequate stiffness and leverage for usual types of house trailers attached to a standard automobile.

The discussion of the operation has been directed to the condition where the trailer wheels and the two sets of vehicle wheels are on a continuous straight support, whether level or inclined. It will be apparent that conditions will be changed when the car and trailer pass over a sharp crest or over a pronounced depression. In passing over a crest, the tension member will slack up somewhat but the tension will be taken up as soon as all wheels are again on a continuous straight surface. The spring cross bar of Figures 1 to 4 and the coil spring of Figure 5 are provided to take care of the situation when the car and trailer pass over a sharp depression. If there were no yielding in the tension member, a condition might arise in which the combination was supported entirely on the front vehicle wheels and the trailer wheels. Normal differences in the height of the support of the various wheels are largely taken care of by the spring suspensions of the several wheels. The resilience of the cross bar or coil spring is important in taking care of sharp differences in elevation and in minimizing the difficulties of as long a combined wheel base as the distance between the front vehicle axle and the trailer wheels.

While I have shown certain preferred embodiments of my invention, these are to be understood as illustrative only, as it is capable of variation and changes to meet differing conditions and requirements, and I contemplate such modifications as come within the spirit and scope of the appended claims.

I claim:

1. In a trailer hitch for connecting a vehicle and trailer, a direct pivoted connection between a rigid frame member of the vehicle and a rigid frame member of the trailer, said connection to the vehicle being located to the rear of the vehicle axle, a tension member connected to the trailer and to the vehicle in a plane below the pivoted connection and extending below the rigid members, the tension member being connected to the vehicle at a point approximately in vertical alignment with the axes of the pivoted connection between the trailer and vehicle, and adjustable means for placing said member under tension whereby a portion of the trailer load is transferred from the rear axle to the front axle of the vehicle.

2. In a trailer hitch for connecting a vehicle and trailer, a direct pivoted connection between a rigid frame member of the vehicle and a rigid frame member of the trailer, said connection to the vehicle being located to the rear of the vehicle axle, a tension member connected to the trailer and to the vehicle in a plane below the pivoted connection and extending below the rigid members, the tension member being connected to the vehicle at a point approximately in vertical alignment with the axes of the pivoted connection between the trailer and vehicle, and means for placing said member under tension, said means comprising a jack carried by the trailer and extending adjustably below the trailer to engage an intermediate portion of the tension member to tension said member whereby a portion of the trailer load is transferred from the rear axle to the front axle of the vehicle.

3. In a trailer hitch for connecting a vehicle having a plurality of spaced pairs of wheels and a trailer having a single set of wheels, both said vehicle and trailer having substantially rigid frames, a pivot member rigidly connected to the rear of the vehicle frame in the rear of the vehicle wheels, a directly coacting pivot member rigidly connected to the trailer frame, a tension member having one end connected to the vehicle frame at a point below the level of the pivot and having its other end connected to the trailer frame, and means to apply a progressive tensioning force to the tension member whereby a portion of the trailer load is transferred from the rear axle to the front axle of the vehicle.

4. In a trailer hitch for connecting a vehicle having a plurality of spaced pairs of wheels and a trailer having a single set of wheels, both said vehicle and trailer having substantially rigid frames, a pivot member rigidly connected to the rear of the vehicle frame in the rear of the vehicle wheels, a directly co-acting pivot member rigidly connected to the trailer frame, a tension member having one end connected to the vehicle frame at a point below the level of the pivot and having its other end connected to the trailer frame, means connected to the tension member for permitting said member to yield under excessive tension, and means to apply a progressive tensioning force to the tension member whereby a portion of the trailer load is transferred from the rear axle to the front axle of the vehicle.

5. In a trailer hitch for connecting a vehicle and trailer, a pivoted connection between rigid members of the vehicle and trailer, said connection comprising a socket on one member and an element on the other member fitting in the socket, the socket and element having flattened surfaces for approximately parallel engagement when the trailer is aligned in rear of the vehicle, and means for yieldingly holding said flattened surfaces in engagement.

6. In a trailer hitch for connecting a vehicle and trailer, a pivoted connection between rigid members of the vehicle and trailer, said connection comprising a socket on one member and an element on the other member fitting in the socket, the socket and element having flattened surfaces for approximately parallel engagement when the trailer is aligned in rear of the vehicle, and means for yieldingly holding said flattened surfaces in engagement, said means comprising a tension member connecting the vehicle and trailer.

7. In a trailer hitch for connecting a vehicle and trailer, a pivoted connection between rigid members of the vehicle and trailer, said connection comprising a socket on one member and an element on the other member fitting in the socket, the socket and element having flattened surfaces for approximately parallel engagement when the trailer is aligned in rear of the vehicle, the surfaces being formed upon a forwardly facing portion of the socket and on a rearwardly facing portion of the interfitting element, and a yielding tension member connecting the vehicle and trailer to hold said flattened surfaces normally in engagement.

DAVID D. AREHART.

REFERENCES CITED

The following references are of record in the file of this patent:

UNITED STATES PATENTS

| Number | Name | Date |
|---|---|---|
| 1,445,754 | Casey | Feb. 20, 1923 |
| 2,309,766 | Harroun et al. | Feb. 2, 1943 |
| 2,360,901 | Simmons | Oct. 24, 1944 |

FOREIGN PATENTS

| Number | Country | Date |
|---|---|---|
| 513,146 | France | Oct. 28, 1920 |
| 541,887 | Germany | Jan. 18, 1933 |